३,६६६,५४१
PROCESS FOR COATING WITH A VINYL
FLUORIDE POLYMER
Roy A. Gray and Moses L. Thomas, Bartlesville, Okla.,
assignor to Phillips Petroleum Company
No Drawing. Filed Mar. 19, 1970, Ser. No. 21,224
Int. Cl. B44d 1/36; C09d 3/78
U.S. Cl. 117—132 CF                     8 Claims

ABSTRACT OF THE DISCLOSURE

High quality polyvinyl fluoride coatings are obtained by applying to a substrate a dispersion of polyvinyl fluoride in a latent solvent comprising sulfolane and water. Sufficient heat is then applied to coalesce the polymer and drive off the sulfolane and water.

BACKGROUND OF THE INVENTION

This invention relates to an improved process for applying polyvinyl fluoride coatings using a latent solvent.

Polyvinyl fluoride has excellent physical properties such as resistance to chemicals and solvents, and excellent resistance to weathering in addition to being tough, durable, and nontoxic. These characteristics make the material ideally suited for coating applications such as housewares and decorative interior panels which require an attractive finish, and exterior panels which require long-term resistance to ultraviolet light. However, polyvinyl fluoride resins are very difficult to apply to a substrate. The polymer tends to deteriorate on heating prior to reaching a sufficiently high temperature to fuse and adhere to the substrate. In addition, it is insoluble in commonly used solvents.

It is known in the art to attempt to circumvent these difficulties by utilizing a latent solvent. In accordance with the known latent solvent technique, the polyvinyl fluoride is dispersed in a diluent such as dimethylacetamide and the dispersion heated to a temperature at which the diluent becomes a partial solvent for the polyvinyl fluoride, thus causing it to coalesce as the heated dimethylacetamide or the like evaporates. It is apparent that the evaporation of the large quantity of solvent required for forming the dispersion is both expensive and undesirable from a safety standpoint.

SUMMARY OF THE INVENTION

It is an object of this invention to provide an improved method for forming polyvinyl fluoride coatings;

It is a further object of this invention to provide an improved latent solvent system for polyvinyl fluoride dispersions; and It is yet a further object of this invention to alleviate the safety hazard inherent with the use of a latent solvent.

In accordance with this invention, high quality polyvinyl fluoride coatings are obtained by dispersing the polyvinyl fluoride in a latent solvent comprising sulfolane and up to 80 weight percent water based on the total weight of sulfolane and water.

DESCRIPTION OF THE PREFERRED EMBODIMENTS

By sulfolane is meant the compound having the following structural formula:

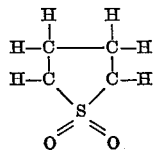

The ratio of sulfolane to water based on the total weight of sulfolane plus water can be within the range of 20 to 80, preferably 51 to 70 weight percent water based on the total weight of water plus sulfolane.

Optionally, the system can contain in addition to the sulfolane-water phase and the polyvinyl fluoride a small amount of a dispersant to aid in dispersing the polyvinyl fluoride. Particularly when the solvent system contains greater than 60 percent water, a dispersant is desirable. Any conventional dispersant, wetting agent, or detergent can be utilized. Examples are sodium alkylnaphthalenesulfonate which is sold under the trade name Alkanol B, sodium N-methyl-N-oleyltaurate, which is sold under the trade name Igepon T, sodium oleylisethionate, which is sold under the trade name Igepon A, nonylphenol ethoxylate, a compound of the formula

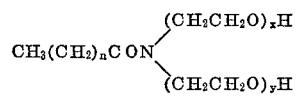

and the like. These dispersing aids can be present in an amount within the range of 0.1 to 5 weight percent.

The coating composition may also contain conventional additives such as plasticizers, pigments, fillers, stabilizers, and the like, which are not decomposed during the heating step.

The ratio of solids (the polyvinyl fluoride) to the solvent system can vary greatly, depending on the viscosity desired in the resulting slurry. Slurries containing 10–75, preferably 25–35, weight percent polyvinyl fluoride are suitable. If the dispersion is to be sprayed onto the substrate, then a lower concentration of solids is desired, whereas if a roller is used to apply the dispersion, a higher concentration is preferred.

The dispersions of the instant invention can be applied to any substrate capable of withstanding the temperatures required in the operation. Specifically, such materials as aluminum, iron, and other metals, glass, leather, wood, cloth, and masonry can be coated with polyvinyl fluoride in accordance with this invention.

While conventional priming coats can be utilized on the substrate prior to the application of the dispersion of this invention, such are not necessary as is shown by the examples where excellent adhesion was obtained on an unprimed substrate.

After the dispersion has been applied to the substrate, the temperature is gradually raised, for instance, by putting the thus coated substrate in an oven, at a temperature of about 450–800° F. for a time sufficient for the solvent to heat up to a temperature at which the polyvinyl fluoride begins to dissolve so as to become tacky and adhere to itself and to the substrate, after which the sulfolane and water evaporate leaving a continuous adherent coating of polyvinyl fluoride on the substrate. The time required for this operation will vary depending on the temperature of the oven and the heat capacity of the substrate and the like. Generally a time of 30 seconds to 10 minutes is sufficient to effect complete evaporation of the sulfolane and water and yet not degrade the polymer. While, as noted hereinabove, the oven temperature can vary considerably and the proper temperature is related to the time employed, these variables are generally controlled so that the temperature of the coating itself reaches a level of about 490–505° F.

The polyvinyl fluoride used in forming the dispersion is preferably in the form of a powder.

Whether the dispersion is applied by spraying, dipping, a doctor blade, a roller or the like, the wet coating will generally have a thickness of 1–30 mils with the final coating having a thickness of 0.2–5 mils.

The invention is primarily directed to the formation of coatings of unplasticized vinyl fluoride homopolymer since such polymers even of only moderate high molecular weight have extremely high viscosities and tend to degrade rather than fuse on simple heating. However, it is within the scope of the invention to utilize polymers of vinyl fluoride having combined therewith a small amount of a comonomer, such as vinyl chloride, and/or mixtures of vinyl fluoride polymers and a small amount of another polymer.

EXAMPLE

Polyvinyl fluoride dispersions were made in three liquid systems as noted hereinbelow. The polyvinyl fluoride used was Dalvor, a product of Diamond Alkali Company. Each of the formulations were applied to aluminum panels that had been degreased with refluxing chloroform, scoured with a cleanser, rinsed with deionized water, and dried. They were applied with a Baker film applicator set to give a 3-mil wet film thickness. The thus coated panels were placed in an air oven at 490–505° F. for 2¾ minutes. Adhesion was determined by a Scotch tape test applied to a section of the coating that had been scored to 1/16-inch squares and reverse impacted with a 32-inch lb. force.

The results were as follows:

|  | I | II | III |
| --- | --- | --- | --- |
| Polyvinyl fluoride, g | 3.0 | 3.0 | 3.0 |
| Water, g | 7.0 | 4.2 | 0 |
| Sulfolane, g | 0 | 2.8 | 7.0 |
| Coating quality | (1) | Excellent | Excellent |

[1] Decomposed and did not adhere.

Formulation II utilizing a liquid phase having 60% water resulted in a coating exactly equivalent to that using pure sulfolane. Both with regard to the Scotch tape test, where none of the squares peeled off with either formulation II or III, and in physical appearance. Formulation I decomposed and did not adhere to the substrate.

It was completely unexpected that a latent solvent system containing predominantly water would result in exactly comparable coatings to that utilizing pure sulfolane in view of the fact that water alone is totally unsatisfactory for this purpose.

While this invention has been described in detail for the purpose of illustration, it is not to be construed as limited thereby and is intended to cover all changes and modifications within the spirit and scope thereof.

We claim:

1. A process for applying a vinyl fluoride polymer coating to a substrate comprising:

forming a dispersion of vinyl fluoride polymer in a latent solvent system comprising water and sulfolane, said water being present in an amount within the range of 20–80 weight percent based on the total weight of said water and sulfolane, the ratio of solids to liquid being such as to give 10–75 weight percent solids, based on the total weight of solids and solvent system;

applying said dispersion to a substrate;

heating said thus applied dispersion to a temperature within the range of 450–800° F. for a time sufficient to effect adhesion of said coating to said substrate and to cause substantially complete evaporation of said water and said sulfolane.

2. The method according to claim 1 wherein said latent solvent system contains between 51 and 70 percent water.

3. The method according to claim 2 wherein said coating is heated to a temperature within the range of 490–505° F.

4. The method according to claim 2 wherein said solids content is within the range of 25–35 weight percent.

5. The method according to claim 2 wherein said substrate is a metal.

6. The method according to claim 2 wherein said substrate is aluminum.

7. The method according to claim 1 wherein said solids content is within the range of 25–35 weight percent, said coating is heated to a temperature of 490–505° F., and said substrate is a metal.

8. The method according to claim 2 wherein said polymer consists essentially of vinyl fluoride homopolymer.

References Cited

UNITED STATES PATENTS

| | | | |
| --- | --- | --- | --- |
| 3,360,396 | 12/1967 | Kennedy et al. | 117—132 |
| 3,454,517 | 7/1969 | Neros et al. | 260—30.2 X |
| 3,340,222 | 9/1967 | Fang | 117—132 X |
| 2,360,859 | 10/1944 | Evans et al. | 260—332.1 UX |
| 3,252,997 | 5/1966 | Ridderikhoff et al. | 260—332.1 |
| 3,071,856 | 1/1963 | Fischbein | 117—132 X |
| 2,504,099 | 4/1950 | Morris et al. | 260—332.1 |
| 2,578,565 | 12/1951 | Mahan et al. | 260—332.1 |
| 3,429,844 | 2/1969 | Neros et al. | 260—30.2 X |

WILLIAM D. MARTIN, Primary Examiner

H. J. GWINNELL, Assistant Examiner

U.S. Cl. X.R.

117—123, 124 E, 142, 148, 161 UH